(12) United States Patent
Valdez et al.

(10) Patent No.: US 10,732,072 B2
(45) Date of Patent: Aug. 4, 2020

(54) DEVICES AND METHODS OF APPLYING ONE OR MORE TESTING FORCES TO A ROTOR BLADE

(71) Applicant: The Boeing Company, Chicago, IL (US)

(72) Inventors: Mario A. Valdez, Mesa, AZ (US); Zach K. Stahlecker, Gilbert, AZ (US); Raymond L. Churchwell, Mesa, AZ (US); Jay A. Schultz, Gilbert, WA (US); David Darrow, Jr., Queen Creek, AZ (US)

(73) Assignee: THE BOEING COMPANY, Chicago, IL (US)

( * ) Notice: Subject to any disclaimer, the term of this patent is extended or adjusted under 35 U.S.C. 154(b) by 135 days.

(21) Appl. No.: 15/886,480

(22) Filed: Feb. 1, 2018

(65) Prior Publication Data

US 2019/0234828 A1 Aug. 1, 2019

(51) Int. Cl.
*G01M 5/00* (2006.01)
*G01N 3/08* (2006.01)
*G01N 3/20* (2006.01)

(52) U.S. Cl.
CPC ........ *G01M 5/0016* (2013.01); *G01M 5/0058* (2013.01); *G01M 5/0075* (2013.01); *G01N 3/08* (2013.01); *G01N 3/20* (2013.01); *G01M 5/005* (2013.01); *G01M 5/0025* (2013.01); *G01N 2203/0026* (2013.01); *G01N 2203/0032* (2013.01); *G01N 2203/04* (2013.01)

(58) Field of Classification Search
CPC .... F05B 2260/83; F05D 2260/83; B64F 5/60; G01M 5/0016; G01M 5/0075; G01M 5/0025; G01M 5/005; G01N 3/08; G01N 2203/0026; G01N 2203/0069; G01N 2203/04; G01N 2203/0032; B64C 27/54
USPC ........ 416/61, 134 A, 136, 138; 73/802, 147, 73/865.9, 865.6
See application file for complete search history.

(56) References Cited

U.S. PATENT DOCUMENTS

| | | | | |
|---|---|---|---|---|
| 3,280,918 A * | 10/1966 | Drees | ...................... | B64C 27/54 416/117 |
| 4,089,211 A * | 5/1978 | Vercellone | ............ | G01M 13/04 73/797 |
| 4,156,583 A * | 5/1979 | Mayerjak | ................ | B64C 27/39 416/134 A |
| 7,524,169 B2 * | 4/2009 | Podgurski | ............. | B64C 27/605 416/168 R |

* cited by examiner

*Primary Examiner* — Kenneth J Hansen
*Assistant Examiner* — Maranatha Boardman
(74) *Attorney, Agent, or Firm* — Coats & Bennett, PLLC

(57) ABSTRACT

A device for testing a rotor blade of an aircraft. The device is configured to receive and secure a shaft of the rotor blade. Once secured, the device is configured to allow for inputting combined loads and bending moments into the rotor blade to simulate the rotor blade behavior in flight. A testing assembly is also disclosed that includes the device and the rotor blade and methods of use that provide for testing the rotor blade.

17 Claims, 8 Drawing Sheets

DEVICES AND METHODS OF APPLYING ONE OR MORE TESTING FORCES TO A ROTOR BLADE

TECHNOLOGICAL FIELD

The present disclosure generally relates to a device for testing a vehicle part. More particularly, the present disclosure relates to devices and methods for applying one or more testing forces to a rotor blade.

BACKGROUND

Rotor blades and other similar components are structurally tested to determine performance criteria. The testing includes securing the rotor blade to a testing device. Once secured, one or more forces are applied to the rotor blade.

The testing device should be configured to securely connect to the rotor blade. The connection ensures that the rotor blade does not detach or loosen during the testing which could affect the testing. Detachment of the rotor blade during testing could also pose a safety hazard to workers performing the testing. The connection should also prevent testing forces to act on the rotor blade in a manner in which it was not intended, such as isolating stresses in a manner that the rotor blade may not experience during use and which is not the purpose of the testing.

The testing device should also test the rotor blade in a manner required by the testing protocol. This can include positioning the rotor blade such that testing forces can be applied in a way in which they would experience during use. Further, the testing device should provide for applying multiple forces simultaneously to the rotor blade. The multiple forces can provide accurate testing results regarding how the rotor blade will perform during use.

SUMMARY

One aspect is directed to a device for testing a rotor blade. The device includes a bearing housing. A simulated hub is positioned in the bearing housing. The simulated hub includes a shaft that extends along an x-axis and a flange that extends radially outward beyond the shaft. The simulated hub also includes an opening located along the shaft to attach to the rotor blade. An outboard bearing and an inboard bearing are each positioned along the simulated hub and configured to allow the simulated hub to rotate about the x-axis. A first plate is mounted to a first side of the bearing housing, and a second plate is mounted to an opposing second side of the bearing housing. A link with a first end is attached to one of the first and second plates and a second end is configured to be attached to the rotor blade at a different position along the x-axis from the mounting position. The simulated hub is configured to be attached to the rotor blade to prevent translation of the simulated hub relative to the rotor blade along the x-axis.

In another aspect, the bearing housing includes an outboard bearing housing and an inboard bearing housing that are mounted together to form an interior space that houses the simulated hub and the outboard and inboard bearings.

In another aspect, the outboard bearing is fixedly mounted to the outboard bearing housing and the inboard bearing is fixedly mounted to the inboard bearing housing.

In another aspect, each of the outboard and inboard bearings is a tapered roller bearing.

In another aspect, an interface member is positioned between the outboard roller bearing and the simulated hub with the interface member including an annular shape to extend around the shaft of the simulated hub and position the outboard bearing in proximity to the flange of the simulated hub.

In another aspect, the outboard bearing contacts directly against the interface member and is spaced away from the simulated hub and the inboard bearing directly contacts the simulated hub.

In another aspect, the link includes a central turnbuckle, a first rod end threaded onto the central turnbuckle and configured to attach to the rotor blade, and a second rod end threaded onto the central turnbuckle and attached to one of the first and second plates with the central turnbuckle being threaded such that rotation of the central turnbuckle relative to at least one of the first and second rod ends adjusts a length of the link.

In another aspect, the simulated hub is solid between a first end and a second end.

Another aspect is directed to a testing assembly that includes a rotor blade having a blade portion and an outwardly extending shaft. A bearing housing having an interior space that extends along an x-axis. A simulated hub is positioned within the bearing housing and extends along the x-axis with the simulated hub including an opening sized to receive a fastener to connect the shaft to the simulated hub and with the simulated hub further including an outboard contact surface and an inboard contact surface. An outboard roller bearing is positioned at the outboard contact surface of the simulated hub and an inboard roller bearing positioned at the inboard contact surface of the simulated hub with the roller bearings supporting the simulated hub to be rotatable within the bearing housing about the x-axis. A first plate is mounted to a first side of the bearing housing. A second plate is mounted to an opposing second side of the bearing housing. A link with an elongated shape has a first end attached to one of the first and second plates and a second end attached to the shaft of the rotor blade away from the opening. The rotor blade is attached to the simulated hub to prevent translation along the x-axis.

In another aspect, the link constrains the rotor blade from rotating about the x-axis.

In another aspect, the shaft of the rotor blade and a shaft of the simulated hub include axes that are coincident with the x-axis.

In another aspect, the bearing housing includes an outboard bearing housing and an inboard bearing housing that are mounted together to form the interior space that houses the simulated hub and the outboard and inboard roller bearings.

In another aspect, the outboard roller bearing is fixedly mounted within the outboard bearing housing and the inboard roller bearing is fixedly mounted in the inboard bearing housing.

In another aspect, the simulated hub includes a cylindrical shaft that extends along the x-axis and a flange that extends radially outward beyond the shaft with the outboard contact surface being located on a first side of the flange and the inboard contact surface being located on an opposing second side of the flange.

In another aspect, an interface member is positioned between the outboard roller bearing and the outboard contact surface of the simulated hub with the interface member including an annular shape to extend around the simulated hub and positions the outboard roller bearing in proximity to the outboard contact surface.

In another aspect, the link includes a central turnbuckle, a first rod end that is threaded onto the central turnbuckle and attached to one of the first and second plates, and a second rod end that is threaded onto the central turnbuckle and attached to the shaft of the rotor blade with the central turnbuckle being threaded such that rotation of the central turnbuckle relative to at least one of the rod ends adjusts a length of the link.

Another aspect is directed to a method of performing testing on a rotor blade. The method includes supporting the rotor blade via a simulated hub with the simulated hub supporting the rotor blade by applying force and/or movement to the rotor blade in an x-direction, y-direction, z-direction, rotational y-direction, rotational z-direction, but not a rotational x-direction. The method includes applying a test load to the rotor blade in at least one of the x-direction, y-direction, z-direction, rotational x-direction, rotational y-direction, or rotational z-direction. The method also includes while applying the test load, constraining the rotor blade from rotating about the x-axis via application of force from a link that is attached to a housing that supports the simulated link.

In another aspect, fixing the rotor blade to the simulated hub includes overlapping a shaft of the rotor blade with a shaft of the simulated hub and inserting the fastener into both of the shafts.

In another aspect, the method includes supporting the rotor blade with a link that includes a load cell.

DETAILED DESCRIPTION

The present application discloses a device for testing a rotor blade of an aircraft. The device is configured to receive and secure a shaft of the rotor blade. Once secured, the device is configured to allow for inputting combined loads and bending moments into the rotor blade to simulate the rotor blade behavior in flight. A testing assembly is also disclosed that includes the device and the rotor blade and methods of use that provide for testing the rotor blade.

Figure 1:
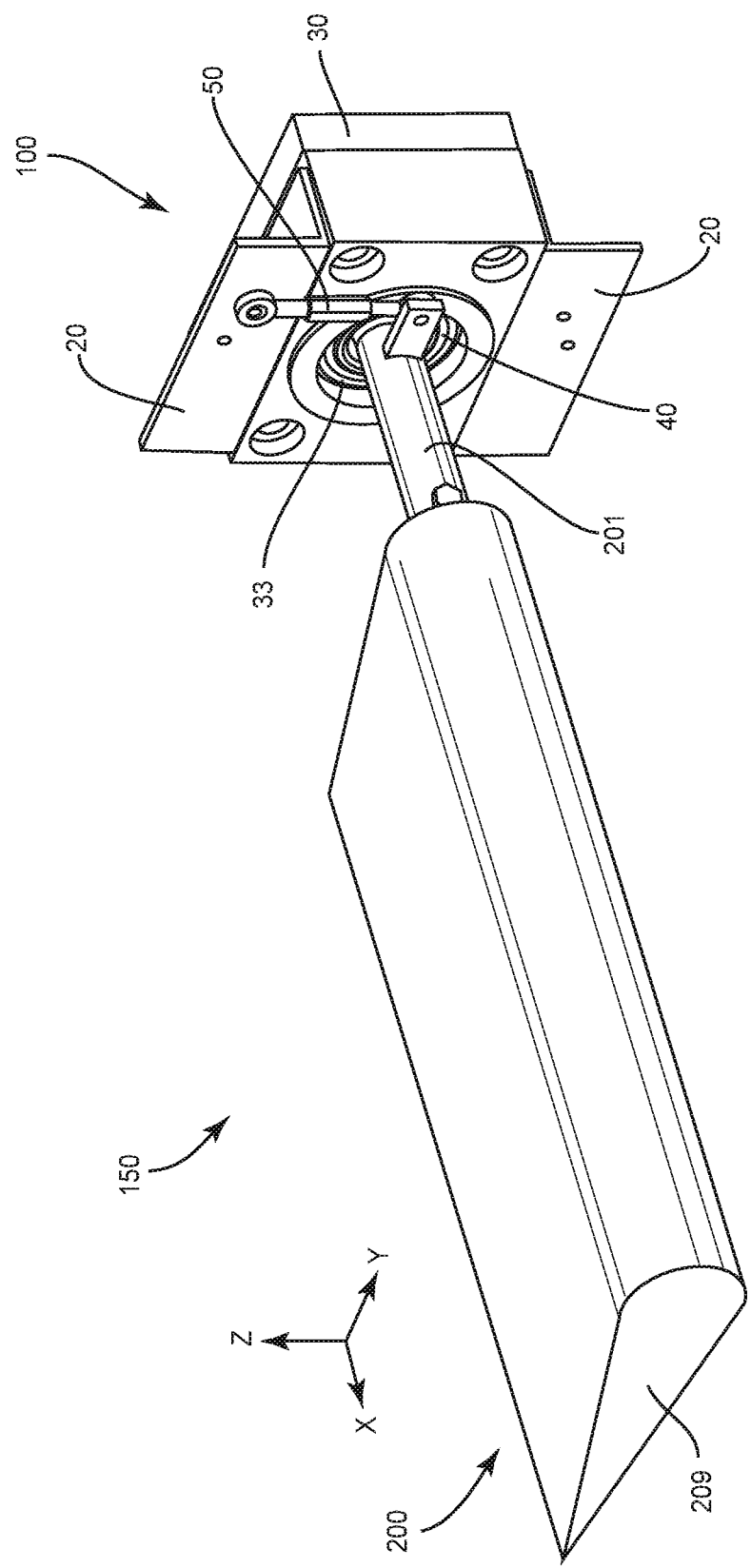
FIG. 1 is a perspective view of a device, a rotor blade, and an assembly that includes the device and the rotor blade.

FIG. 1 illustrates a device 100 for testing a rotor blade 200. The device 100 includes a housing 30 with an opening 33 that leads into an interior space. Components including at least a roller bearing 40 are positioned in the housing 30 to engage with the shaft 201. Plates 20 are attached to the housing 30. A link 50 is attached to the shaft 201 and one of the plates 20. The device 100 provides for applying forces on the rotor blade 200 to test the rotor blade 200 in flight-like conditions.

An assembly 150 is also illustrated in FIG. 1 that includes the device 100 and the rotor blade 200. The rotor blade 200 includes a shaft 201 and a blade portion 209. During testing, one or more forces and bending moments are inputted onto the rotor blade 200. The loads are reacted through the link 50 into one of the plates 20. Further, the plates 20 can be adjusted relative to the housing 30 to provide the option of loading the rotor blade 200 with varying angles of attack.

Figure 2:
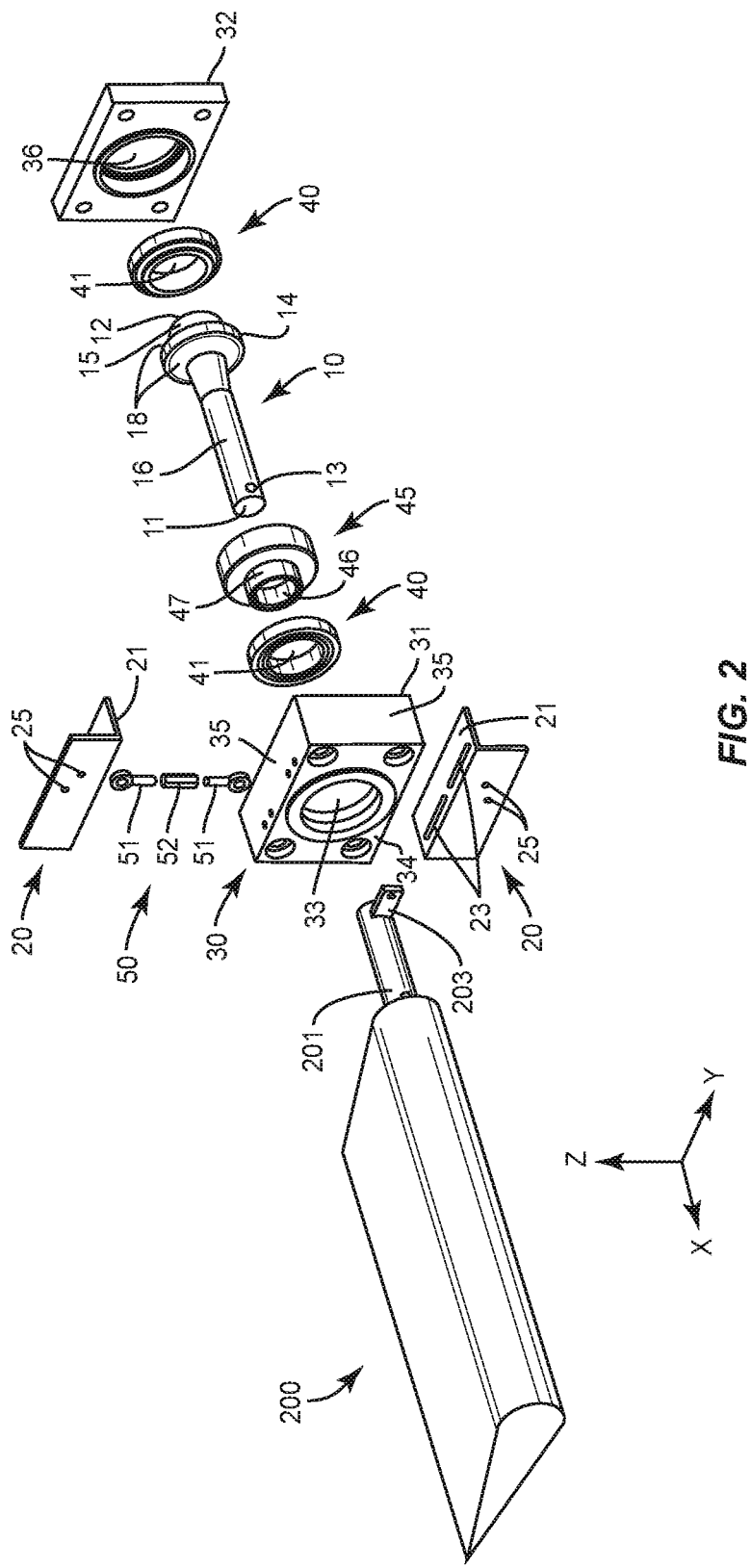
FIG. 2 is an exploded view of a device and a rotor blade.

FIG. 2 illustrates an exploded view of the device 100 and the rotor blade 200. The device 100 includes the housing 30, plates 20, and link 50. The interior components can include a simulated hub 10, roller bearings 40, and an interface member 45.

Figure 3:
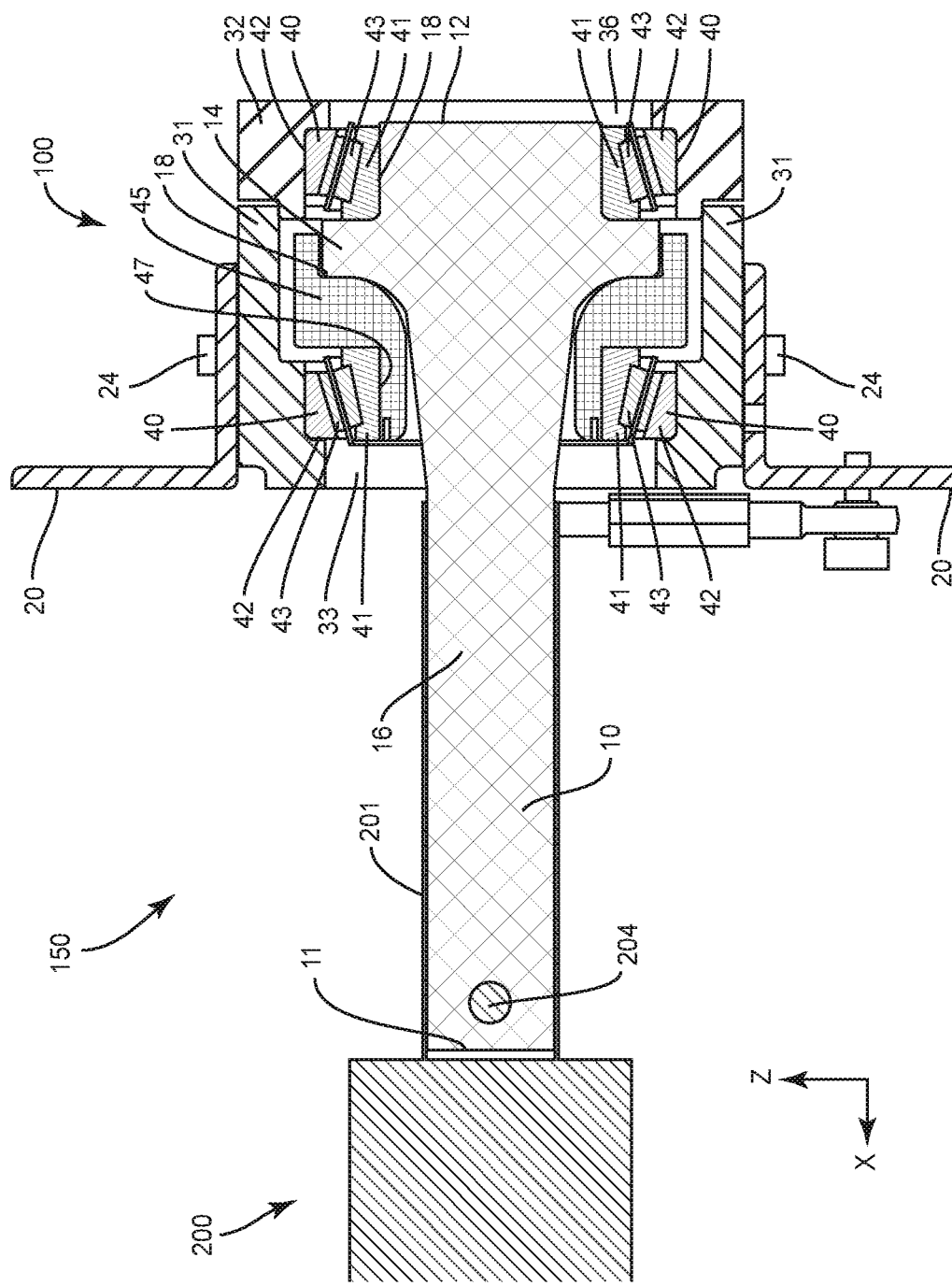
FIG. 3 is a sectional view of a rotor blade attached to a device

The simulated hub 10 includes a cylindrical shaft 16 and has an elongated shape with a first end 11 and a second end 12. An opening 13 is positioned in proximity to the first end 11. A flange 14 is positioned in proximity to the second end 12 and extends radially outward beyond the cylindrical shaft 16. The flange 14 can include one or more contact surfaces 18. The contact surfaces 18 can include the same or different diameters. FIG. 3 illustrates an outboard contact surface 18 on a first portion of the flange 14 and an inboard contact surface 18 on a second portion of the flange 14.

The simulated hub 10 can be solid from the first end 11 to the second end 12 as illustrated in FIG. 3. This can increase the strength of the simulated hub 10 which allows for higher moments to be applied to the rotor blade 200. In other designs, the simulated hub 10 can be hollow along one or more portions or the entirety.

Roller bearings 40 provide for rotation of the simulated hub 10. Each roller bearing 40 includes an annular shape with a circular central opening 41 that receives the simulated hub 10. As illustrated in FIG. 3, the roller bearings 40 include a tapered shape and each includes an inner race 41 and an outer race 42. Rollers 43 are positioned between and contact against each of the inner and outer races 41, 42. Each of the inner and outer races 41, 42 are segments of cones and the rollers 43 can be tapered. This configuration can support axial forces and radial forces that are applied to the simulated hub 10. The tapered shape of the roller bearings 40 reacts the axial load that is applied to the rotor blade 200. The tapered shape also allows for the reaction of flap and chord moments. The roller bearings 40 can also include other non-tapered designs with various rollers, such as but not limited to ball bearing designs.

An interface member 45 is positioned between a first one of the roller bearings 40 and the simulated hub 10. The interface member 45 includes an annular shape with a central opening 46 that receives the cylindrical shaft 16 of the simulated hub 10. A shelf 47 extends around the central opening 46 and is sized to receive the outboard roller bearing 40. The shelf 47 includes a circular sectional shape when viewed from an axial end of the interface member 45. An inboard roller bearing 40 is positioned at the contact surface 15 of the flange 14 at the second end 12 of the simulated hub 10. Each of the roller bearings 40 are positioned with the inner race 41 that engages with the simulated hub 10 and an outer race that engages with the housing 30. The roller bearings 40 provide for rotation of the simulated hub 10 relative to the housing 30.

FIG. 2 includes a pair of roller bearings 40 that engage with the simulated hub 10. The device 100 can also include a single roller bearing 40, or three or more roller bearings 40 to engage with the simulated hub 10. In device 100 with multiple roller bearings 40, the roller bearings 40 can be the same or different in shape, size, and/or construction.

FIG. 2 also includes the interface member 45 positioned between one of the roller bearings 40 and the simulated hub 10. The device 100 can also include another interface member 45 that engages with one or more of the other roller bearings 40. The device 100 can also include each of the one or more roller bearings 40 directly engaging with the simulated hub 10 with no interface member 45.

The housing 30 extends around the simulated hub 10 and roller bearings 40. The housing 30 can include an outboard section 31 and an inboard section 32 that can be connected together to form the interior space to contain the components. The outboard section 31 includes the opening 33 within a front wall 34. The sectional size of the opening 33 is larger than the cylindrical shaft 16 of the simulated hub 10. The opening 33 is formed by a wall that engages with the outer race 42 of the outboard roller bearing 40. The outboard section 31 also includes side walls 35 that extend from the front wall 34.

The inboard section 32 is sized to connect with the side walls 35 of the outboard section 31 to form the interior space. An opening 36 extends through the inboard section 32. The opening 36 includes a circular shape and is formed by a wall that engages with the outer race 42 of the inboard roller bearing 40. The outboard and inboard sections 31, 32 can be connected together by fasteners (not illustrated) that extend through openings in the outboard section 31 and engage with opening in the inboard section 32.

Plates 20 are mounting to opposing side walls 35 of the outboard section 31 of the bearing housing 30. The plates 20 include a first section 21 that is positioned at one of the side walls 35. Openings 23 extend through the first section 21 to receive fasteners to secure the plates 20 to the inboard section 31. The openings 23 can include a larger sectional size that the fasteners 24 such that plates 20 can be adjusted relative to the housing 30. The openings 23 can include various shapes, including slot as illustrated in FIG. 2, circles, ovals, etc. This sizing provides for the adjusted as needed to load the rotor blade 200 during testing with varying angles of attack.

The plates 20 also include a second section to secure the plates 20 to a support member. The plates 20 can include an L-shape with each of the sections being flat and connected along an edge at a perpendicular angle. Openings 25 extend through the second section to receive fasteners to secure the link 50.

The link 50 secures the rotor blade shaft 201 to one of the plates 20. The link 50 can include a turnbuckle design with threaded rod ends 51 and a central turnbuckle 52 with opposing threaded ends. The turnbuckle 52 is threaded onto each of the rod ends 51 and can be rotated in opposing directions to lengthen or extend the overall length of the link 50 as needed. Each of the rod ends 51 further includes a receptacle sized to receive a fastener to secure the link 50 to the plate 20. The link 50 is positioned with a first rod end 51 secured with a fastener to an opening 25 in one of the plates 20 and a second rod end 51 secured with a fastener to a pitch horn 203 that extends radially outward from the shaft 201.

FIG. 3 illustrates a sectional view of the rotor blade 200 attached to the device 100. This includes the first end 11 of the simulated hub 10 positioned in the interior of the rotor blade shaft 201. A mounting position 204 is provided for mounting the shaft 201 to the simulated hub 10. This can include a fastener that extends through an opening in the shaft 201 and into the opening 13 (see FIG. 2) in the simulated hub 10. The link 50 extends between and is secured by fasteners to the pitch horn 203 of the shaft 201 and one of the plates 20. The fastener that attaches the rotor blade 200 to the simulated hub 10 is positioned along the axis of the simulated hub 10 away from the pitch horn 203 where the link 50 is attached to the rotor blade 200.

The interface member 45 is positioned on the simulated hub 10 at the flange 14 and contacts the simulated hub 10 at the contact surface 18. The inboard roller bearing 40 is positioned between and engaged with the contact surface 18 at the shelf 47 of the interface member 45. The outer race 42 of the inboard roller bearing 40 is engaged with the outboard section 31 of the bearing housing 30. The outboard roller bearing 40 is positioned between and engaged with the contact surface 15 of the simulated hub 10 and the inboard section 32 of the bearing housing 30. The roller bearings 40 provide for rotation of the simulated hub 10 relative to the housing 30.

FIG. 3 illustrates the first end 11 of the simulated hub 10 extending outward beyond the housing 30. The first end 11 can also be positioned inward of the front wall 34 of the outboard section 31 of the bearing housing 30 or aligned with the front wall 34.

In use, the rotor blade 200 is attached to the device 100 by inserting the first end 11 of the simulated hub 10 within the open end of the shaft 201. Once inserted, the fastener secures the positioning at the mounting position 204. The link 50 is attached to the pitch horn 203 of the rotor blade 200 and the plate 20. The attachment at the pitch horn 203 is spaced away from the mounting position 204 where the rotor blade 200 is attached to the simulated hub 10.

Once secured, various loads and bending moments can be applied to the rotor blade 200 that simulates the behavior of the rotor blade 200 in flight. The simulated hub 10 is able to rotate with the rotor blade 200 due to the roller bearings 40. The loads are reacted through the link 50 into the adjustable plates 20 with the adjustability of the adjustable plates 20 providing the option of loading the rotor blade 200 with varying angles of attack.

Figure 4:
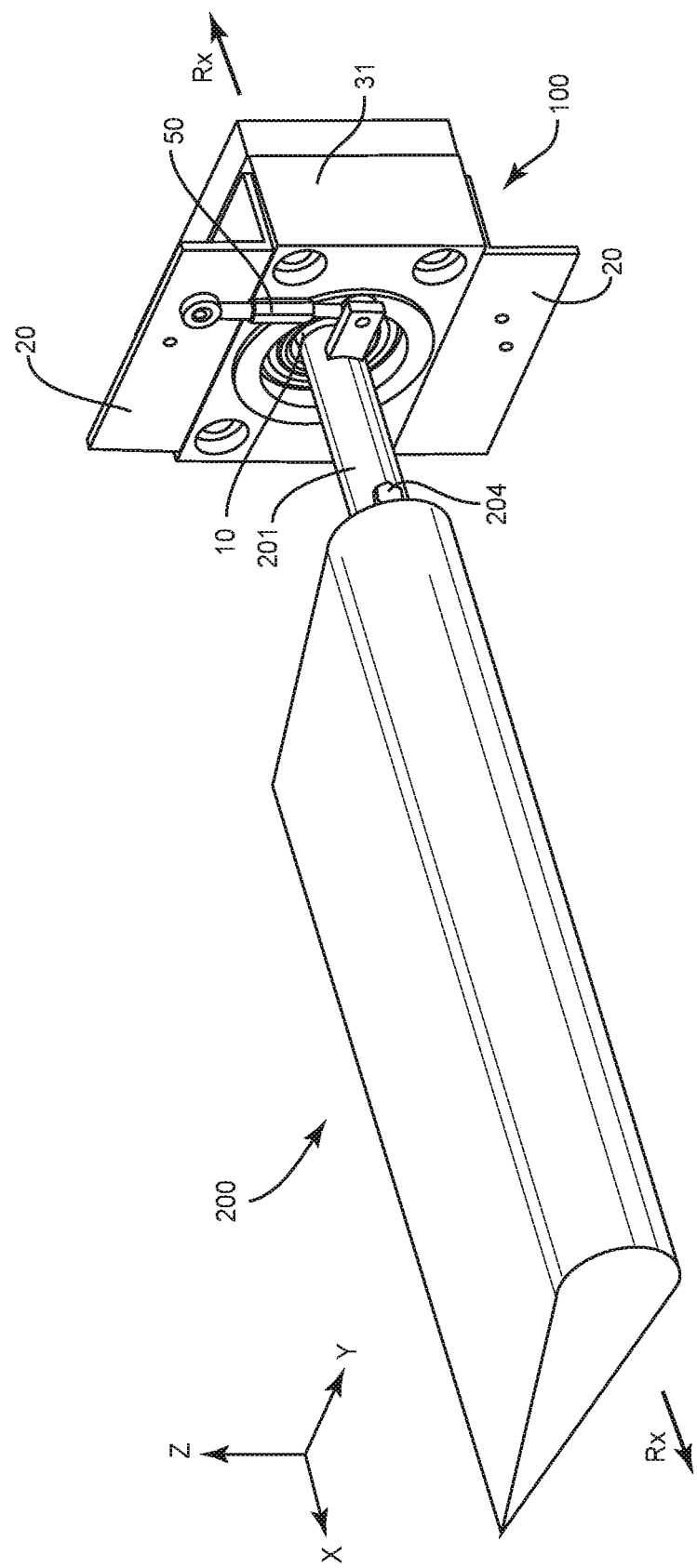
FIG. 4 is a force diagram of a simulated centrifugal force testing of a rotor blade attached to a device.

FIG. 4 illustrates simulated centrifugal force testing on the rotor blade 200. This testing includes applying a load Rx to the rotor blade 200 along an X-axis with the device 100 being fixed in the X-axis. A centrifugal force is transmitted through the rotor blade 200 into the fastener which reacts against the simulated hub 10. This force in turn reacts into the outboard section 31 of the bearing housing 30.

Figure 5:
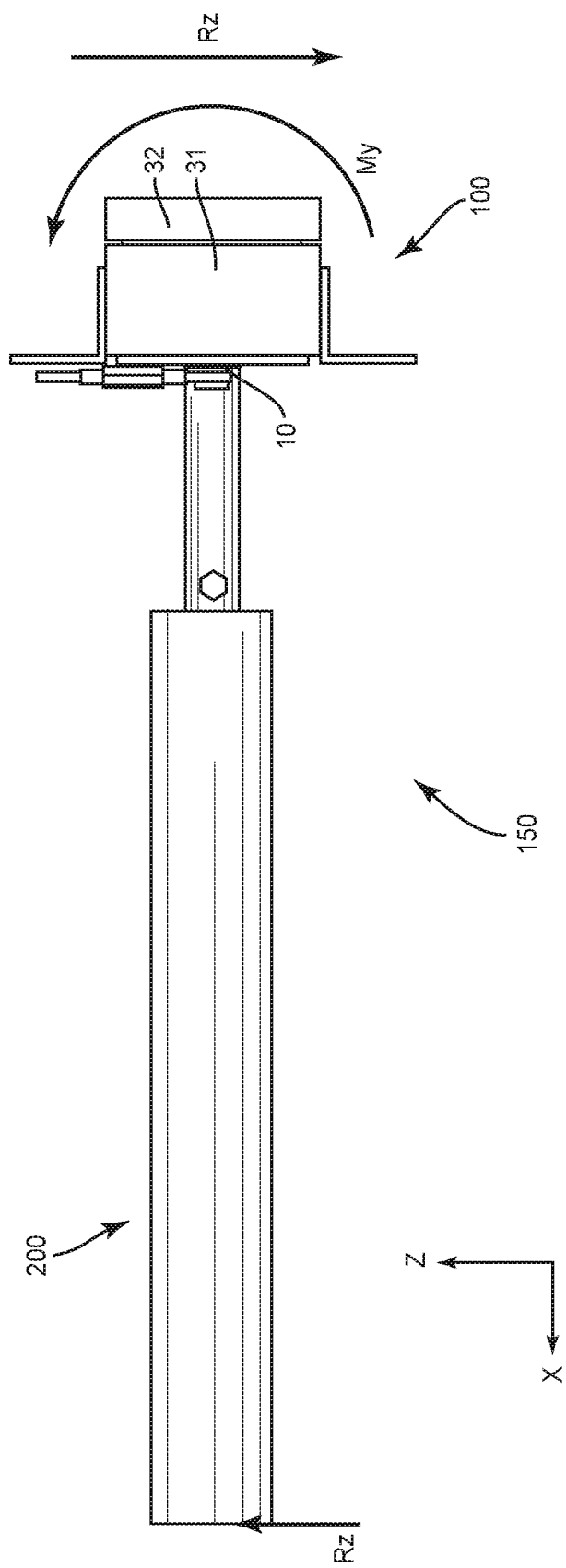
FIG. 5 is a force diagram of a flap bending moment testing of a rotor blade attached to a device.

FIG. 5 illustrates a force applied to the rotor blade 200 creating a flap bending moment. This testing includes fixing the rotor blade 200 in a z-direction. A load Rz is applied to the rotor blade 200 causing an applied moment My about a y-axis. A flap bending moment about the y-axis is transmitted through the rotor blade 200 into the simulated hub 10. This in turn reacts against the roller bearings 40 (not illustrated in FIG. 5) which in turn reacts into the inboard section 32 and the outboard section 31 of the bearing housing 30.

Figure 6:
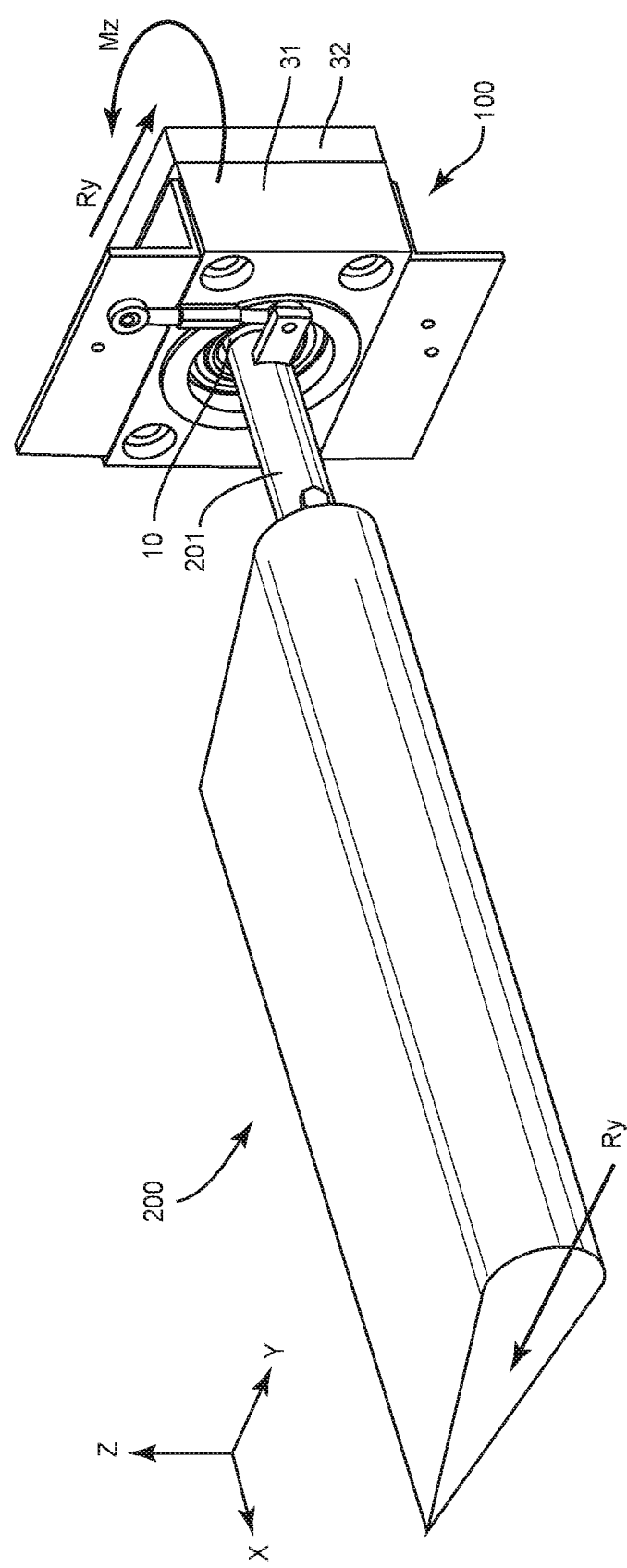
FIG. 6 is a force diagram of a chord bending moment testing of a rotor blade attached to a device.

FIG. 6 includes a chord bending moment in which the rotor blade 200 is loaded with a force Ry in the y-direction. The force Ry is applied at a tip of the rotor blade 200 away from the device 100. The device 100 is fixed in the y-direction. A chord being moment about the z-axis is transmitted through the rotor blade 200 into the simulated hub 10. The simulated hub 10 reacts against the roller bearings 40 which then reacts with the inboard section 31 and the outboard section 32.

Figure 7:
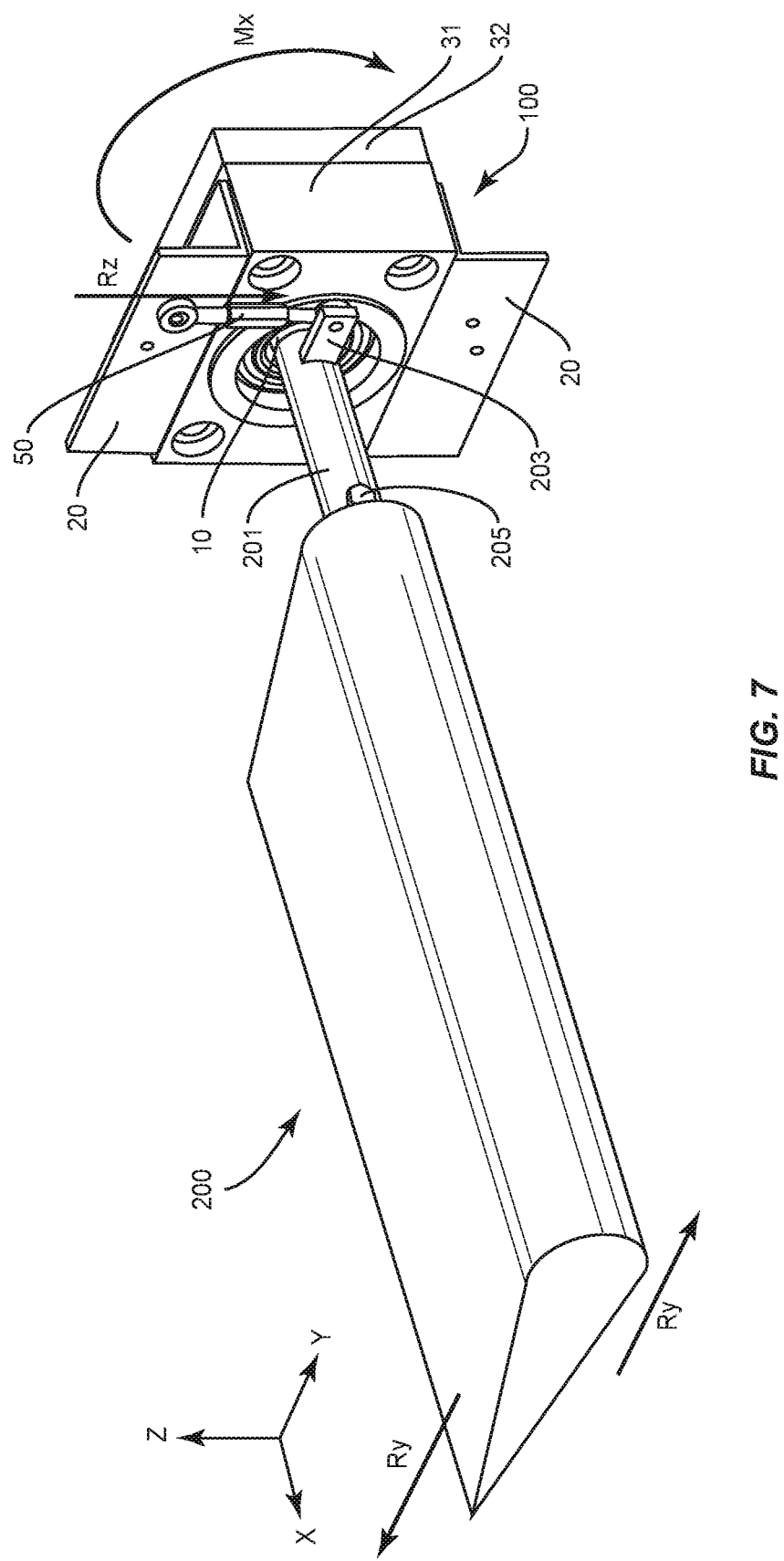
FIG. 7 is a force diagram of torsion testing of a rotor blade attached to a device.

FIG. 7 illustrates a torsion test applied to the rotor blade 200. The rotor blade 200 is twisted in the x-direction while the device 100 is fixed about the x-axis. Torsion about the x-axis is transmitted through the rotor blade 200 into the link 50. This reacts against the attached plate 20 which then reacts into the outboard section 31 of the bearing housing 30. The link 50 is attached to the rotor blade 200 at a point along the x-axis that is spaced away from the fastener 205 that connects the rotor blade shaft 201 to the simulated hub 10. The device 100 is configured to prevent translation of the simulated hub 10 relative to the rotor blade 200 along the x-axis.

Figure 8:
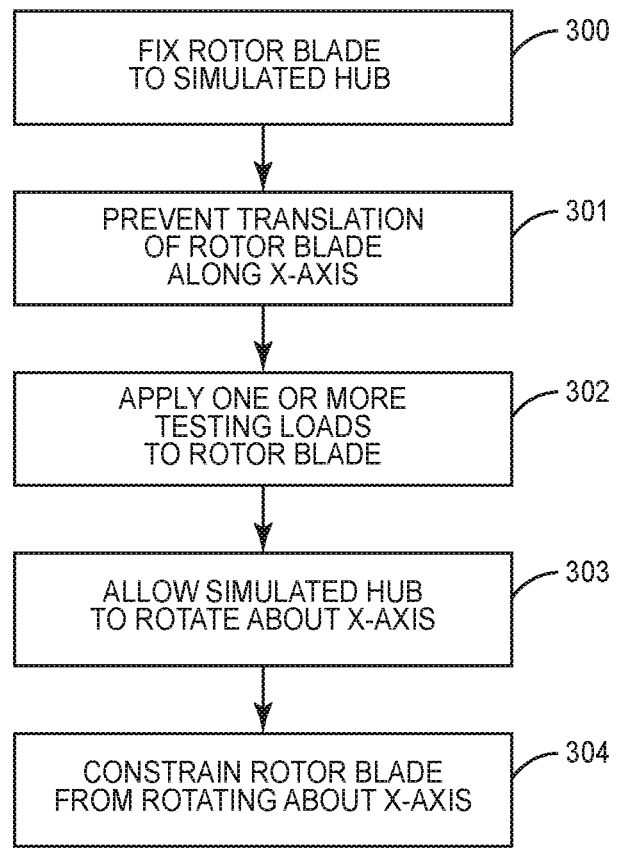
FIG. 8 is a flowchart diagram of a method of testing a rotor blade with a device.

FIG. 8 illustrates a method of testing the rotor blade 200 using the device 100. The rotor blade 200 is fixed to the simulated hub 10 (block 300). This can include inserting the fastener 204 into each of the rotor blade shaft 201 and the simulated hub 10. The simulated hub 10 is secured within the device 100 to prevent translation of the rotor blade 200 along an x-axis that extends through the simulated hub 10 (block 301). One or more testing loads is then applied to the rotor blade 200 (block 302). During the loading, the simulated hub 10 is not constrained about the x-axis and is able to rotate (block 303). During the loading, the rotor blade 200 is constrained from rotating about the x-axis (block 304). This constraint occurs by the link 50 that is attached to the pitch horn 203 and one of the plates 20.

The device 100 can be used to test blades on a variety of vehicles. One blade is a rotorcraft rotor blade, such as a helicopter rotor blade. Other blades can be used on a variety of different vehicles include but not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof.

The present disclosure can be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A device for testing a rotor blade, the device comprising:
   a bearing housing comprising an opening that leads into an interior space;
   a simulated hub comprising a shaft that extends along an x-axis and a flange that extends radially outward beyond the shaft, the simulated hub extending through the opening and further comprising a mounting position located along the shaft and positioned on a first side of the opening away from the interior space to attach to the rotor blade and with the flange positioned on a second side of the opening within the interior space;
   an outboard bearing and an inboard bearing each positioned along the simulated hub to allow the simulated hub to rotate about the x-axis;
   a first plate mounted to a first side of the bearing housing;
   a second plate mounted to an opposing second side of the bearing housing; and
   a link having a first end attached to one of the first and second plates and a second end configured to be attached to the rotor blade at a different position along the x-axis from the mounting position, the second end positioned on the first side of the opening away from the interior space of the bearing housing;
   the simulated hub configured to be attached to the rotor blade to prevent translation of the simulated hub relative to the rotor blade along the x-axis.

2. The device of claim 1, wherein the bearing housing comprises an outboard section and an inboard section that are mounted together to form an interior space that houses the simulated hub and the outboard and inboard bearings.

3. The device of claim 2, wherein the outboard bearing is fixedly mounted to the outboard section and the inboard bearing is fixedly mounted to the inboard section.

4. The device of claim 3, wherein each of the outboard and inboard bearings is a tapered roller bearing.

5. The device of claim 1, further comprising an interface member positioned between the outboard bearing and the simulated hub, the interface member comprising an annular shape to extend around the shaft of the simulated hub and position the outboard bearing in proximity to the flange of the simulated hub.

6. The device of claim 5, wherein the outboard bearing contacts directly against the interface member and is spaced away from the simulated hub, and the inboard bearing directly contacts the simulated hub.

7. The device of claim 1, wherein the link comprises a central turnbuckle, a first rod end threaded onto the central turnbuckle to attach to the rotor blade, and a second rod end threaded onto the central turnbuckle and attached to one of the first and second plates, the central turnbuckle being threaded such that rotation of the central turnbuckle relative to at least one of the first and second rod ends adjusts a length of the link.

8. The device of claim 1, wherein the simulated hub is solid between a first end and a second end of the simulated hub.

9. The device of claim 1, wherein each of the first and second plates is adjustable relative to the bearing housing.

10. A testing assembly comprising:
    a rotor blade comprising a blade portion and an outwardly extending shaft;
    a bearing housing comprising an interior space that extends along an x-axis;
    a simulated hub comprising an elongated shape that is aligned along the x-axis and that is partially contained within the interior space of the bearing housing and having a first section positioned outward beyond the interior space and a second section positioned within the interior space, the first section of the simulated hub comprising an opening sized to receive a fastener to connect the shaft to the simulated hub, the second section of the simulated hub further comprising an outboard contact surface and an inboard contact surface;
    an outboard roller bearing positioned at the outboard contact surface of the simulated hub and an inboard roller bearing positioned at the inboard contact surface of the simulated hub, the roller bearings supporting the simulated hub to be rotatable about the x-axis;
    a first plate mounted to a first side of the bearing housing;
    a second plate mounted to an opposing second side of the bearing housing; and
    a link with an elongated shape having a first end attached to one of the first and second plates and a second end attached to the shaft of the rotor blade away from the opening and outward from the interior space;
    the rotor blade attached to the simulated hub to prevent translation along the x-axis.

11. The testing assembly of claim 10, wherein the link constrains the rotor blade from rotating about the x-axis.

12. The testing assembly of claim 10, wherein the shaft of the rotor blade and a shaft of the simulated hub include axes that are coincident with the x-axis.

13. The testing assembly of claim 10, wherein the bearing housing comprises an outboard section and an inboard section that are mounted together to form the interior space that houses the second section of the simulated hub and the outboard and inboard roller bearings.

14. The testing assembly of claim 13, wherein the outboard roller bearing is fixedly mounted within the outboard section and the inboard roller bearing is fixedly mounted in the inboard section.

15. The testing assembly of claim 10, wherein the simulated hub comprises a cylindrical shaft that extends along the x-axis and a flange that extends radially outward beyond the shaft, the outboard contact surface being located on a first side of the flange and the inboard contact surface being located on an opposing second side of the flange.

16. The testing assembly of claim 10, further comprising an interface member positioned between the outboard roller bearing and the outboard contact surface of the simulated hub, the interface member comprising an annular shape to extend around the simulated hub and position the outboard roller bearing in proximity to the outboard contact surface.

17. The testing assembly of claim 10, wherein the link comprises a central turnbuckle, a first rod end that is threaded onto the central turnbuckle and attached to one of the first and second plates, and a second rod end that is threaded onto the central turnbuckle and attached to the shaft of the rotor blade, the central turnbuckle being threaded such that rotation of the central turnbuckle relative to at least one of the rod ends adjusts a length of the link.

\* \* \* \* \*